(12) United States Patent
Cano et al.

(10) Patent No.: US 12,261,846 B2
(45) Date of Patent: *Mar. 25, 2025

(54) CONFIRMING AUTHENTICITY OF A USER TO A THIRD-PARTY SYSTEM

(71) Applicants: EQUIFAX, INC., Atlanta, GA (US); FIDELITY INFORMATION SERVICES, LLC, Jacksonville, FL (US)

(72) Inventors: Helcio Cano, Peachtree Corners, GA (US); Rich Huffman, Roswell, GA (US); Ravindra Bijlani, Alpharetta, GA (US); Richard Michaelson, Shoreview, MN (US); Rob Harris, Minneapolis, MN (US); Vivian Van Zyl, Atlanta, GA (US); Esther Pigg, Duluth, GA (US); Marty Romain, Oakdale, MN (US)

(73) Assignees: Equifax, Inc., Atlanta, GA (US); Fidelity Information Services, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,333

(22) Filed: Apr. 10, 2024

(65) Prior Publication Data

US 2024/0259372 A1    Aug. 1, 2024

Related U.S. Application Data

(63) Continuation of application No. 18/128,628, filed on Mar. 30, 2023, now Pat. No. 11,962,590, which is a
(Continued)

(51) Int. Cl.
| | |
|---|---|
| *H04L 9/40* | (2022.01) |
| *H04L 67/53* | (2022.01) |
| *H04L 9/32* | (2006.01) |
| *H04L 67/306* | (2022.01) |
| *H04W 12/06* | (2021.01) |

(52) U.S. Cl.
CPC ........ *H04L 63/0884* (2013.01); *H04L 63/083* (2013.01); *H04L 67/53* (2022.05);
(Continued)

(58) Field of Classification Search
CPC ... H04L 63/0884; H04L 63/083; H04L 67/53; H04L 9/3271; H04L 67/306;
(Continued)

(56) References Cited

U.S. PATENT DOCUMENTS

| | | |
|---|---|---|
| 11,962,590 B2 | 4/2024 | Cano et al. |
| 2012/0017266 A1 | 1/2012 | Dichiara et al. |

(Continued)

FOREIGN PATENT DOCUMENTS

| | | |
|---|---|---|
| WO | WO 2015170118 | 11/2015 |
| WO | WO 2018129373 | 7/2018 |

OTHER PUBLICATIONS

Extended European Search Report in EP 22172670.6, dated Jul. 12, 2022, 8 pages.
(Continued)

*Primary Examiner* — Huan V Doan
(74) *Attorney, Agent, or Firm* — Fish & Richardson P.C.

(57) ABSTRACT

A telecommunications network server system provides a digital identifier to a user device. The digital identifier may include identification data corresponding to a user of the user device. In addition, the telecommunications network server system receives, from one or more third-party systems, requests to authenticate the user for an electronic transaction with the respective third-party system. The telecommunications network server system provides a unique electronic transaction code to each third-party system. Responsive to receiving from the user device one of the unique electronic transaction codes, the telecommunications
(Continued)

network server system provides, to the respective third-party system, authentication of the user.

19 Claims, 5 Drawing Sheets

Related U.S. Application Data continuation of application No. 17/523,674, filed on Nov. 10, 2021, now Pat. No. 11,632,371, which is a continuation of application No. 16/473,182, filed as application No. PCT/US2018/012658 on Jan. 5, 2018, now Pat. No. 11,223,621.

(60) Provisional application No. 62/443,236, filed on Jan. 6, 2017.

(52) U.S. Cl.
CPC .......... *H04L 9/3271* (2013.01); *H04L 67/306* (2013.01); *H04L 2463/102* (2013.01); *H04W 12/06* (2013.01)

(58) Field of Classification Search
CPC ............ H04L 2463/102; H04W 12/06; H04W 12/61; H04W 12/77
See application file for complete search history.

(56) References Cited

U.S. PATENT DOCUMENTS

| | | |
|---|---|---|
| 2013/0132234 A1 | 5/2013 | Grossi et al. |
| 2013/0219479 A1* | 8/2013 | DeSoto .............. G06Q 20/4014 726/6 |
| 2013/0334323 A1 | 12/2013 | Chiviendacz et al. |
| 2015/0235211 A1 | 8/2015 | Hurry et al. |
| 2015/0334108 A1* | 11/2015 | Khalil ................. H04L 63/0815 726/8 |
| 2016/0019539 A1 | 1/2016 | Hoyos et al. |
| 2016/0294821 A1 | 10/2016 | Neuman et al. |
| 2020/0092287 A1 | 3/2020 | Cano et al. |
| 2022/0070169 A1 | 3/2022 | Cano et al. |
| 2023/0239295 A1 | 7/2023 | Cano et al. |

OTHER PUBLICATIONS

Office Action in Australian Application No. 2018206414, dated Nov. 23, 2021, 6 pages.

Office Action in Australian Application No. 2022203766, dated Apr. 26, 2023, 4 pages.

PCT International Search Report and Written Opinion in International Application No. PCT/US2018/012658, dated Apr. 23, 2018, 16 pages.

* cited by examiner

CONFIRMING AUTHENTICITY OF A USER TO A THIRD-PARTY SYSTEM

CROSS-REFERENCE TO RELATED APPLICATIONS

This application is a continuation and claims priority to U.S. application Ser. No. 18/128,628 filed on Mar. 30, 2023, which is a continuation and claims priority to U.S. application Ser. No. 17/523,674 filed on Nov. 10, 2021, which is a continuation and claims priority to U.S. application Ser. No. 16/473,182 filed on Jun. 24, 2019, which is a U.S. National Stage of PCT/US2018/012658 filed on Jan. 5, 2018, which claims priority to U.S. Provisional Application No. 62/443,236 for "Confirming Authenticity of a User to a Third-Party System," filed Jan. 6, 2017, which are incorporated by reference herein in their entirety.

TECHNICAL FIELD

This disclosure relates generally to the field of secure authentication, and more specifically relates to authentication of requests for online interactions.

BACKGROUND

A consumer associated with a user device, such as a personal computer or mobile device, may use the device to interact with another party, such as an online service. For example, a consumer can use his or her user device to begin a transaction to open an account within an online service. To verify the identity of the consumer, the online service may request authenticating information, such as personally identifiable information. But, the consumer may enter the information incorrectly on the user device, or may not have access to all of the requested information at the user device (e.g., if the user is using a mobile device away from home). Consequently, the user may become frustrated with the authentication process, and disengage from the transaction.

Additionally or alternatively, an online service may receive a fraudulent transaction request from an impersonator who relies on the relative anonymity provided by the Internet to engage in fraudulent online transactions. For example, the impersonator may enter the user's personal information from a different device that is not associated with the user. But, the online service may not be able to determine that the impersonator's device is not associated with the user.

SUMMARY

According to certain implementations, a telecommunications network server device authenticates a user to a third-party computing system. For example, the telecommunications network server provides a digital identifier to a user device associated with the user. Additionally or alternatively, the telecommunications network server receives an authentication request from the third-party computing system. The authentication request may be for an electronic transaction between the third-party computing system and the user device. In response to receiving the authentication request, the telecommunications network server may transmit to the third-party computing system an electronic transaction code. In some cases, the third-party computing system provides the electronic transaction code to the user device. In some implementations, the telecommunications network server receives the electronic transaction code and the digital identifier from the user device. In addition, the telecommunications network server may confirm the electronic transaction code and the digital identifier, such as by confirming that the digital identifier is associated with the user device, or by confirming that the electronic transaction code was provided to the third-party system. In response to confirming the electronic transaction code and the digital identifier, the telecommunications network server may transmit to the third-party system a confirmation of authenticity of the user device and associated user.

These illustrative aspects are mentioned not to limit or define the disclosure, but to provide examples to aid understanding thereof. Additional aspects are discussed in the Detailed Description, and further description is provided there.

DESCRIPTION OF THE DRAWINGS

Features, aspects, and advantages of the present disclosure are better understood when the following Detailed Description is read with reference to the accompanying drawings, where.

DETAILED DESCRIPTION

Figure 1:
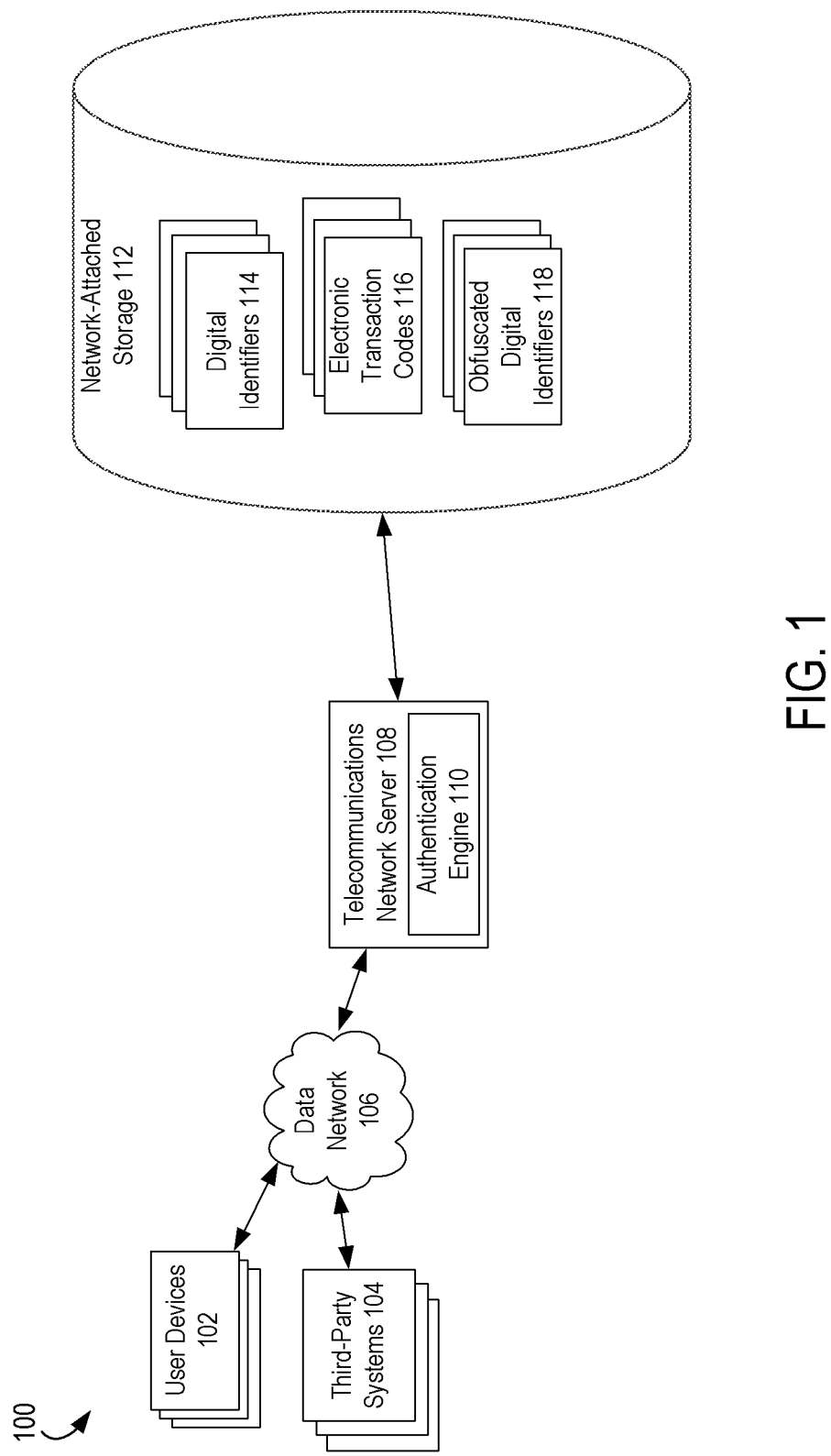
FIG. 1 is a block diagram depicting an example of a computing system for confirming the authenticity of a user seeking to use a user device for conducting electronic transactions, according to certain aspects.

Certain aspects and features of the present disclosure relate to a system that can confirm the authenticity of a user seeking to conduct electronic transactions with third parties. The system can authenticate the user to third parties while providing control for authentication to the user. After registering a user, a digital identifier can be provided to, and stored on, a user device associated with the user. The system can receive a request from a third party that the user is seeking to conduct an electronic transaction with the third party and that the user needs to be authenticated before the electronic transaction can be conducted. The system can provide a transaction code electronically to the third party and the third party can provide the transaction code to the user. The system can receive, from the user device, both the digital identifier and the transaction code. After confirming both, the system can provide confirmation of authenticity of the user to the third party. Techniques to authenticate a user associated with a user device that is requesting a transaction may reduce fraudulent transactions that are requested using stolen or false personal information. In addition, techniques to provide identifying information to the third party may reduce entry errors by users, and may improve the completion rate of the requested transactions. The user can transact with multiple third parties seamlessly and more securely without requiring the user to remember or have authentication credentials for each of the multiple parties separately. Furthermore, the user can be authenticated without necessarily providing personal identification information to the third parties and can optionally control how much personal identification information is provided by the system to the third party. Techniques can authenticate a user requesting a transaction with a third party, and allow the third party to receive personal information about the authenticated user.

A system according to some aspects can act as a proxy agent that is vouching for the user to the third party. During the registration process, the user can be sufficiently authenticated (e.g., by using multiple levels of authentication or by using an authentication process that is of high confidence). After successful registration, the user can have the power to choose from which third party to allow themselves to be authenticated and, in some examples, whether to allow the system to provide personal identification information about the user to the third party. For example, the user can instruct the system as to the type and amount of personal identification information or "PII" to share with the third party, potentially making completion of forms and other issues with the transaction more efficient. Examples of PII include name, address, sex, age, social security number, place of birth, mother's maiden name, etc.

In some examples, the user can experience an easier authentication process while also reducing the number of false positives or fraudulent transactions that may be otherwise possible. The need for the user to supply or input the user's PII to the third party to complete the authentication process with the third party can be eliminated. The user can enjoy convenience, increased security through factors of authentication introduced before fulfillment, risk-based scoring, reduced opportunity for failure and data input inaccuracy, and a reduction in abandonment related to input fatigue. For example, if each third party conducts its own authentication process, the user often is asked to input, repeatedly, his or her PII and is authenticated at each third party using that PII. The user may tire or input inaccurately his or her PII and refuse to proceed with the transaction (such as opening an account or accessing protected information from the third party). Using some examples of a system according to the present disclosure can help a user avoid such repetitive and error-prone authentication processes.

The digital identifier may be tethered or bounded to the user device such that the user is required to use that user device to communicate with the system. For example, the digital identifier may be associated within the system with the user device's media access control ("MAC") address or some other device identifier and is prevented from being transferred from the user device to another user device. The digital identifier, however, can be "federated" in the sense that it can be used by the user to authenticate the user with respect to multiple third parties without requiring the user to provide PII to any of the third parties.

The transaction code may be any suitable information that indicates a requested transaction. In some aspects, the transaction code may be a Quick Response ("QR") code that can be displayed by the third party and scanned by the user device, saving even more time and effort for the user. Additionally or alternatively, the transaction code may be another type of digital identifier that is provided to the user device via any suitable process. The system can track the amount of time after it provides the transaction code to the third party for access by the user before the user provides the code and the digital identifier to the system, and refuse to confirm authenticity of the user after a certain amount of time to prevent fraud.

The system can include a telecommunications network server that can communicate through a network port to a telecommunications network that can include the Internet, cellular network, WiFi networks, near-field communication networks, other networks, or any combination of these. The telecommunications network server can execute an authentication engine to manage communications with the user device and third-party electronic devices that are separate from the server and from each other, access a database in which is stored user PII and other information about the user, and otherwise manage the process of confirming the authenticity of the user to the third parties. Optionally, the telecommunications network server may generate and provide the digital identifier to the user device. In other examples, a separate system generates the digital identifier and provides it to the user device.

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Example of an Operating Environment

Referring now to the drawings, FIG. 1 depicts an example of a computing system 100 that is usable for confirming the authenticity of a user seeking to use a user device 102 for conducting electronic transactions with third-party systems 104 that are operated by or otherwise associated with third parties. FIG. 1 depicts examples of hardware components of a computing system 100 according to some aspects. The computing system 100 is a specialized computing system that may be used for performing large amounts of authentication operations using a large number of computer processing cycles.

The numbers of devices depicted in FIG. 1 are provided for illustrative purposes. Different numbers of devices may be used. For example, while certain devices or systems (e.g., a telecommunications network server 108, a network-attached storage 112, etc.) are shown as single devices in FIG. 1, multiple devices may instead be used to implement these devices or systems (e.g., a cloud or grid-based telecommunications network server system, a group of network-attached storage devices, etc.).

The computing system 100 can include one or more user devices 102. The user devices 102 may include client devices that can communicate with the telecommunications network server 108. For example, the user devices 102 may send data to the telecommunications network server 108 to be processed, may send signals to the telecommunications network server 108 to control different aspects of the computing environment or the data it is processing. The user devices 102 may interact with the telecommunications network server 108 via one or more data networks 106.

The computing system 100 can include one or more third-party systems 104. Each the third-party system 104 may include one or more third-party electronic devices (e.g., computing devices or groups of computing devices), such as individual servers or groups of servers operating a distributed manner. A third-party system 104 can communicate with the telecommunications network server 108. For example, third-party systems 104 may send data to the telecommunications network server 108 to be processed, may send signals to the telecommunications network server 108 to control different aspects of the computing environment or the data it is processing. The third-party systems 104 may interact with the telecommunications network server 108 via one or more data networks 106. The third-party systems 104 may also interact with the user devices 102 via one or more data networks 106 to facilitate electronic transactions between users of the user devices 102 and third-parties that use, operate, or are otherwise associated with the third-party systems 104.

Each communication within the computing system 100 (e.g., between user devices 102 and the telecommunications network server 108, between third-party systems 104 and the telecommunications network server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to telecommunications network server 108. For example, a data network 106 may include local area network devices, such as routers, hubs, switches, or other computer networking devices. The data networks 106 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The computing system 100 can also include a telecommunications network server 108. The telecommunications network server 108 may be a specialized computer or other machine that processes the data received within the computing system 100. The telecommunications network server 108 can include one or more processing devices that execute program code, such as an authentication engine 110. The program code is stored on a non-transitory computer-readable medium.

The authentication engine 110 can execute a set of operations for authenticating a user of a user device 102. The authentication engine 110 can configure the telecommunications network server 108 to communicate data with one or more third-party systems 104 regarding the authentication of the user, as described in further detail herein.

The telecommunications network server 108 may include one or more other systems. For example, the telecommunications network server 108 may include a database system for accessing the network-attached storage 112, a communications grid, or both. A communications grid may be a grid-based computing system for processing large amounts of data.

The computing system 100 may also include one or more network-attached storage 112. The network-attached storage 112 may store a variety of different types of data organized in a variety of different ways and from a variety of different sources. For example, the network-attached storage 112 may include storage other than primary storage located within telecommunications network server 108 that is directly accessible by processors located therein. In some aspects, the network-attached storage 112 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage 112 can include memory devices for storing digital identifiers 114, electronic transaction codes 116, and obfuscated digital identifiers 118. One or more of the digital identifiers 114, electronic transaction codes 116, and obfuscated digital identifiers 118 can be received by a telecommunications network server 108 via a data network 106, generated by the telecommunications network server 108 based on communications with user devices 102, generated by the telecommunications network server 108 based on communications with third-party systems 104, or some combination thereof.

The digital identifiers 114 can include identification data (e.g., numerical data, alphanumeric data, or some other suitable set of data) that corresponds to a particular user of a user device 102. The telecommunications network server 108 can generate or otherwise obtain a digital identifier 114 for a particular user and transmit the digital identifier 114 to a user device 102 for storage on the user device 102. In authentication operations, the authentication engine 110 can match copies of digital identifiers 114, which are received via one or more data networks 106, to stored digital identifiers 114 and thereby verify the identities of certain users of user devices 102.

For example, in an online session between a third-party system 104 and a user device 102 having a copy of a digital identifier 114, the user device 102 can provide the digital identifier 114 and an electronic transaction code 116 to the telecommunications network server 108. The authentication engine 110 executed by the telecommunications network server 108 can use the digital identifier 114 and the electronic transaction code 116 to authenticate a user of the user device 102. The authentication engine 110 can cause the telecommunications network server 108 to send a confirmation of this authentication to the third-party system 104.

The electronic transaction codes 116 can include identification data (e.g., numerical data, alphanumeric data, or some other suitable set of data) that corresponds to transactions between user devices 102 and third-party systems 104. Each electronic transaction code 116 can uniquely identify or otherwise correspond to a particular transaction between a user of a user device 102 and a third party associated with a third-party system 104.

The obfuscated digital identifiers 118 can include transformed versions of the digital identifiers 114 that are usable by third-party systems 104 for authenticating users. The authentication engine 110 (or other program code executed by the telecommunications network server 108) can generate a transformed version of a digital identifier 114 by copying the digital identifier 114 and altering data in the copy of the digital identifier 114 to create an obfuscated digital identifier 118. In some aspects, a particular obfuscated digital identifier 118 is specific to a given third-party system 104 associated with a particular third party. For example, the telecommunications network server 108 may use the same digital identifier 114 to generate two different obfuscated digital identifiers 118 for different third parties that may enter into transactions with the user corresponding to the digital identifier 114.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Examples of Authentication Operations

The following examples of authentication operations are provided for illustrative purposes. These illustrative examples involve, for example, secure authentications of users who are entering into transactions with third parties (e.g., consumers who are opening new accounts with commercial entities). In some aspects, the authentication operations described in this disclosure can provide a simplified authentication process for the user. For instance, the authentication operations described in this disclosure can reduce the need for a user to provide PII or other sensitive data to enter into a transaction with a third party. The authentication engine 110 can authenticate a user through a trusted device (e.g., a user device 102) and provide PII for the authenticated user to a third party (e.g., a commercial entity) as part of a transaction between the user and the third party.

Figure 2:
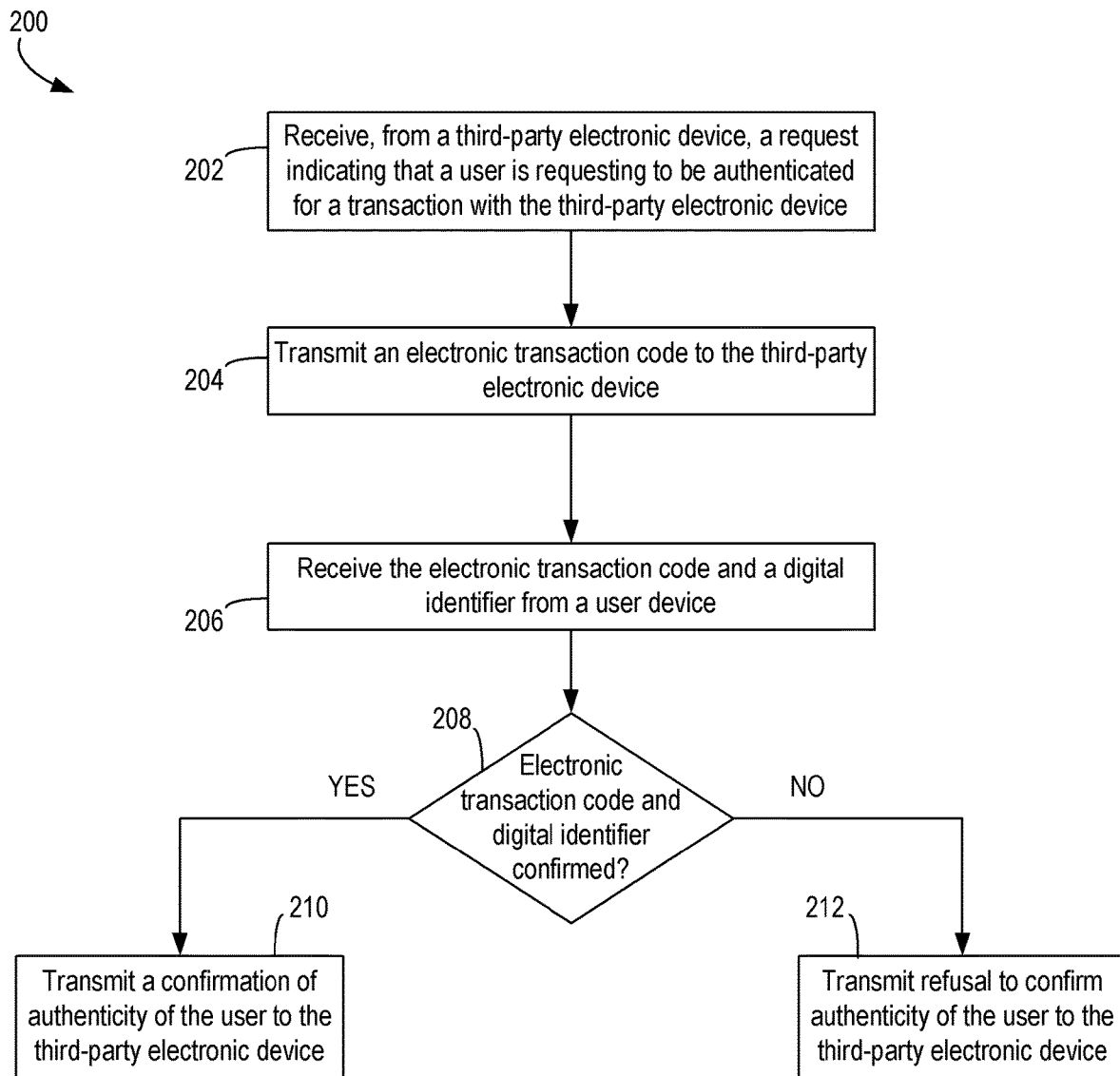
FIG. 2 is a flow chart depicting an example of a method for confirming the authenticity of a user seeking to conduct electronic transactions with third parties, according to certain aspects.

FIG. 2 is a flow chart depicting an example of a method 200 for confirming the authenticity of a user seeking to conduct electronic transactions with third parties. For illustrative purposes, the method 200 is described with reference to the implementation depicted in FIG. 1 and various other examples described herein. But other implementations are possible.

The method 200 can include receiving, from a third-party electronic device, a request indicating that a user is requesting to be authenticated for a transaction with the third-party electronic device, as depicted in block 202. The authentication engine 110 can be executed by one or more suitable processing devices to implement block 202. The telecommunications network server 108 can execute the authentication engine 110 to receive the request via a network communications port or other suitable network interface device.

For example, an online session can be established between a user device 102 and one or more third-party systems 104 via the Internet or another data network 106. The session can allow a user device 102 to communicate with the third-party system 104 and thereby conduct one or more electronic transactions involving the user device 102 and an online service that is hosted by (or otherwise associated with) the third-party system 104. If the user must be authenticated for one or more transactions with the third-party system 104, the user device 102 can indicate to a third-party system 104 that a user of the user device 102 has a digital identifier 114 that is maintained by the telecommunications network server 108. The third-party system 104 can transmit, based on this indication, a request to the telecommunications network server 108 to perform one or more operations for authenticating the user.

The method 200 can also include transmitting an electronic transaction code to the third-party electronic device, as depicted in block 204. The authentication engine 110 can be executed by one or more suitable processing devices of the telecommunications network server 108 to implement block 204. For example, the authentication engine 110 can generate or otherwise obtain an electronic transaction code 116 in response to receiving the request at block 202. The authentication engine 110 can associate the electronic transaction code 116 with the request such that the electronic transaction code 116 is specific to a particular third party. The authentication engine 110 can configure the telecommunications network server 108 to transmit the electronic transaction code 116 to the third-party electronic device.

The method 200 can also include receiving the electronic transaction code and a digital identifier from a user device, as depicted in block 206. The authentication engine 110 can be executed by one or more suitable processing devices of the telecommunications network server 108 to implement block 206.

The method 200 can also include attempting to confirm the electronic transaction code and the digital identifier, as depicted in block 208. The authentication engine 110 can be executed by one or more suitable processing devices of the telecommunications network server 108 to implement block 208. For example, the authentication engine 110 can confirm a copy of an electronic transaction code 116 that has been received from a user device 102 and a copy of a digital identifier 114 that has been received from the user device 102.

Confirming the electronic transaction code can include verifying that the transaction code has not expired. In some aspects, an electronic transaction code 116 can expire if it is received from a user device 102 at block 206 after a threshold amount of time passes since the electronic transaction code 116 has been transmitted to a third-party system 104 device at block 204.

Confirming the digital identifier can include verifying the authenticity of a user associated with the digital identifier. In some aspects, the telecommunications network server 108 can transmit a digital identifier 114 to a user device 102 prior to the method 200 being performed. The digital identifier 114 can be transmitted to the user device 102 based on the telecommunications network server 108 authenticating a user of the user device 102 (e.g., using PII or other data about the user that may be stored in the network-attached storage 112 or another non-transitory computer-readable medium). The digital identifier can be electronically tethered or bound to the user device 102.

At block 208, the telecommunications network server 108 can respond to receiving the electronic transaction code and the digital identifier by transmitting a demand to the user device 102 for the user to provide confirmatory input to the user device. The confirmatory input can include, for example, a personal identification number, a password, an answer to a challenge question provided by the authentication engine 110, scanned fingerprint or other biometric, etc. Confirming the digital identifier can include the authentication engine 110 receiving this confirmatory input and matching the confirmatory input to data about the user (e.g., a credential or other authentication information, biometric information, etc.) that is stored in the network-attached storage 112 or another non-transitory computer-readable medium accessible to the telecommunications network server 108. If the telecommunications network server 108 does not receive the confirmatory input from the user device, the telecommunications network server 108 can refuse to provide confirmation that the user has been authenticated.

If the electronic transaction code and the digital identifier are confirmed, the method 200 can include transmitting a confirmation of authenticity of the user to the third-party electronic device, as depicted in block 210. The authentication engine 110 can be executed by one or more suitable processing devices of the telecommunications network server 108 to implement block 210. In one example, the telecommunications network server 108 can transmit a confirmation of authenticity subsequent to verifying that the electronic transaction code has not expired and receiving confirmatory input from the user device.

In some aspects, the telecommunications network server 108 can transmit additional data about the user to the third-party electronic device subsequent to transmitting the confirmation of authenticity of the user. For example, the telecommunications network server 108 may receive, from a user device 102, a command to share PII about the user with the third-party system 104. The command may include or be accompanied by a specification of one or more types of PII to be shared with the third-party system 104. The telecommunications network server 108 can respond to the command by transmitting, to the third-party system 104, the specified PII.

If the electronic transaction code and the digital identifier are not confirmed, the method 200 can include transmitting, to the third-party electronic device, a refusal to confirm authenticity of the user, as depicted in block 212. The authentication engine 110 can be executed by one or more suitable processing devices of the telecommunications network server 108 to implement block 212.

Although FIG. 2 describes the method 200 with respect to a single third party, the telecommunications network server 108 can perform the method 200 with respect to a given user and multiple third parties associated with separate third-party systems 104. For example, the telecommunications network server 108 can receive requests from multiple third-party systems 104 that are separate from one another. The telecommunications network server 108 can respond to the requests by performing one or more operations described above with respect to blocks 204-208. The telecommunications network server 108 can transmit multiple electronic transaction codes to the third-party electronic devices, where each electronic transaction code is a unique code that corresponds to one transaction. The telecommunications network server 108 can receive these electronic transaction codes and the digital identifier from a user device 102. The telecommunications network server 108 can confirm the electronic transaction codes and the digital identifier and, if the electronic transaction codes and the digital identifier are confirmed, transmit confirmations of authenticity of the user to the third-party systems 104.

Figure 3:
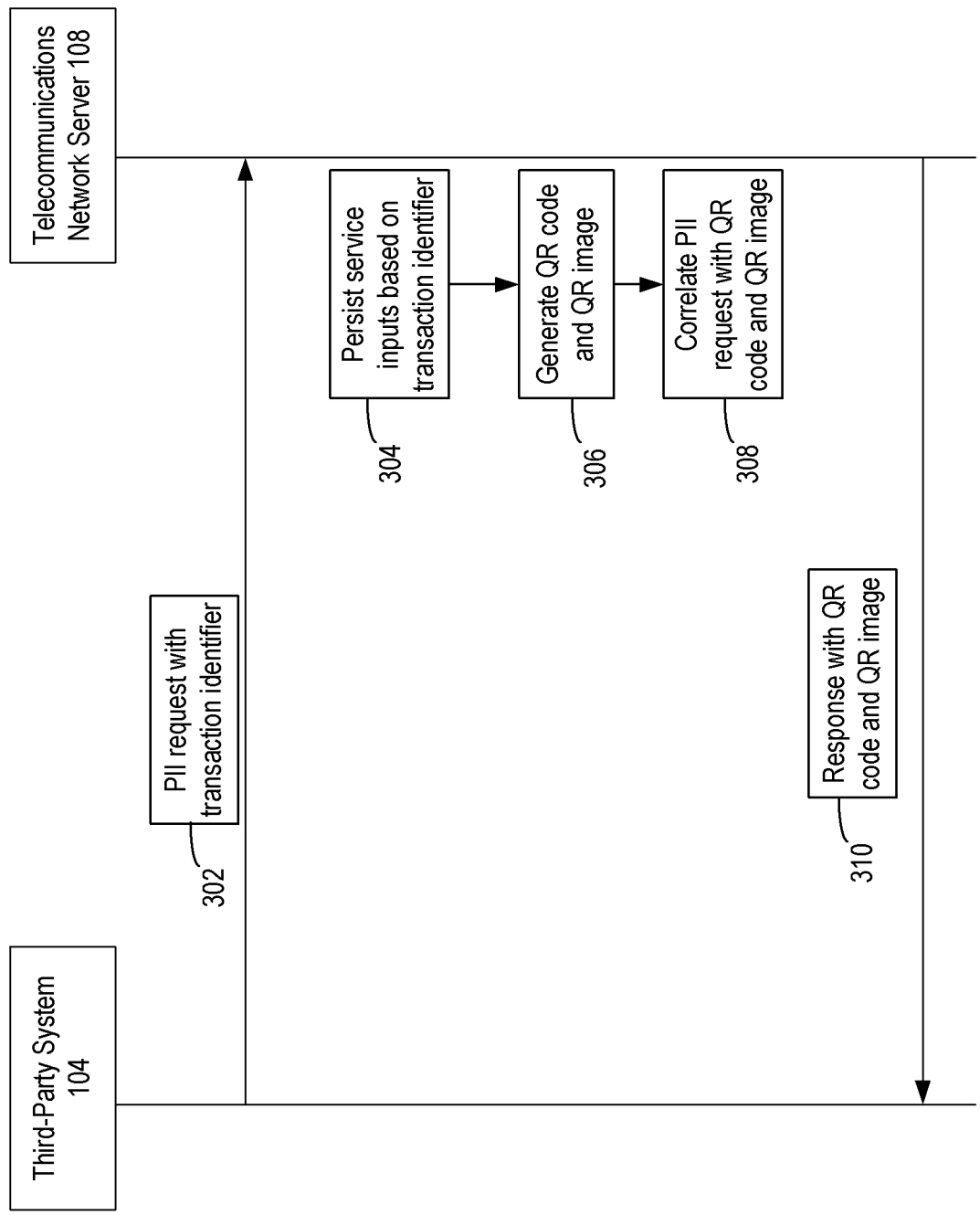
FIG. 3 is a flow chart depicting an example of a data flow in which an electronic transaction code is provided from a telecommunications network server to a third-party system, according to certain aspects.

FIG. 3 depicts an example of a data flow between a third-party system 104 and a telecommunications network server 108 in which an electronic transaction code 116 is provided from the telecommunications network server 108 to the third-party system 104. In some aspects, the data flow depicted in FIG. 3 can be used to implement blocks 202 and 204 of the method 200. For illustrative purposes, FIG. 3 depicts an example in which the electronic transaction code 116 is a QR code and the transaction associated with the electronic transaction code 116 involves a PII request by the third-party system 104. But other implementations are possible. For example, the electronic transaction code 116 may be an identifier that is provided to the user device via another technique.

In this example, the telecommunications network server 108 can receive, via a data network and from a third-party system 104, a communication 302 that includes a PII request and a transaction identifier. The user device 102 can transmit the communication 302 via any suitable client application, such as a web browser application that can access the telecommunications network server 108 via the Internet or other data network 106. The transaction identifier can identify a transaction involving the user device 102 and a third-party system 104. For example, the transaction identifier may be a session key that identifies a communication session in which a user accesses a third party's service via the Internet (e.g., by accessing an online financial service and initiating a claim or other financial transaction).

In some aspects, the communication 302 received from the user device 102 can also include additional data. One example of this additional data is a channel signature. The channel signature can include information about a browser application being used by the user device 102 to access the third party's online service, a geographical location of the user device, etc. Another example of this additional information is an identifier for the third party. The telecommunications network server 108 can respond to receiving the communication 302 by performing operations 304, 306, and 308 and transmitting a responsive communication 310 to the third-party system 104.

In operation 304, the telecommunications network server 108 can persist service inputs based on the transaction identifier included in the communication 302. For example, the telecommunications network server 108 can generate a record in a suitable data structure (e.g., a database stored in the network-attached storage 112). The telecommunications network server 108 can store the PII request, along with any other additional data (e.g., the channel signature) included with the request, in the generated record. The record can include the transaction identifier as a unique identifier for these stored service inputs.

In operation 306, the telecommunications network server 108 can generate a QR code (or other electronic transaction code). The telecommunications network server 108 can also generate a QR image that is scannable by a scanning device that is included in or communicatively coupled to the user device 102. The QR image can encode the QR code.

In operation 308, the telecommunications network server 108 can correlate the PII request with one or more of the generated QR code and the generated QR image. In one example, the telecommunications network server 108 can store one or more of the generated QR code and the generated QR image in the record generated at operation 304. In another example, the telecommunications network server 108 can generate a record in a suitable data structure (e.g., a database stored in the network-attached storage 112) and store one or more of the generated QR code and the generated QR image in the record.

The telecommunications network server 108 can transmit a responsive communication 310 to the third-party system 104. The responsive communication 310 can include one or more of the generated QR code and the generated QR image. The third-party system 104 can cause one or more the QR code and the QR image to be displayed in (or otherwise accessible via) the same communication channel through which a user device 102 has accessed a third-party system 104.

Figure 4:
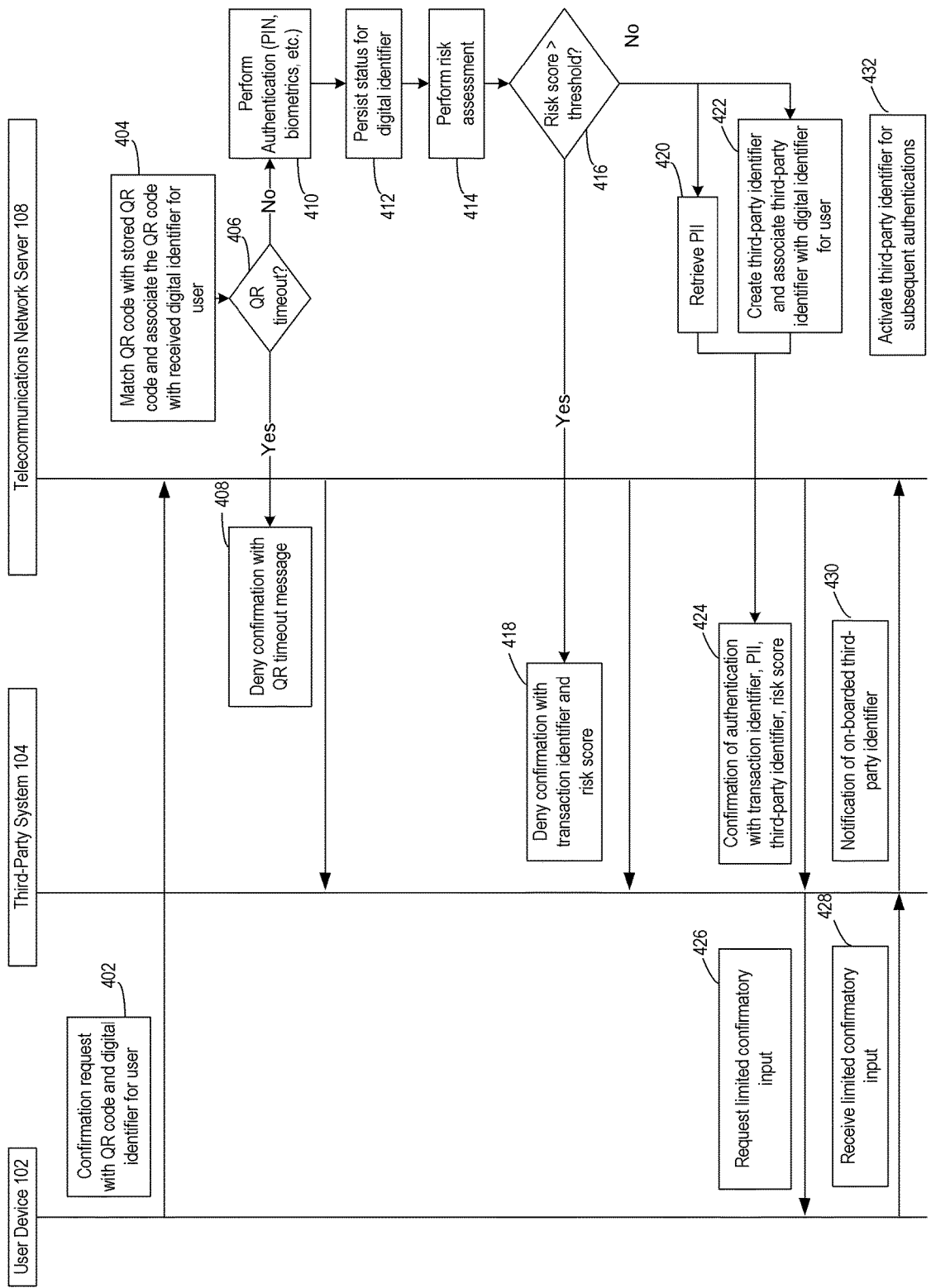
FIG. 4 is a diagram depicting an example of a data flow in which a telecommunications network server either provides or denies a confirmation of a user's authenticity, according to certain aspects.

The QR code provided to the third-party system 104 can subsequently be used by a user device 102 to request that the telecommunications network server 108 confirm the authenticity of a user of the user device 102. For example, FIG. 4 depicts an example of a data flow involving a user device 102, a third-party system 104, and a telecommunications network server 108 in which the telecommunications network server 108 either provides a confirmation of a user's authenticity or denies the confirmation. In some aspects, the data flow depicted in FIG. 4 can be used to implement blocks 206-212 of method 200. For illustrative purposes, FIG. 4 depicts an example in which the electronic transaction code is a QR code and the transaction between the user device 102 and the third-party system 104 involves transmission of PII to the third-party system 104. But other implementations are possible.

In this example, the telecommunications network server 108 can receive, via a data network and from a user device 102, a communication 402 that includes a confirmation request. The confirmation request can include a QR code (or other electronic transaction code) and a digital identifier for the user of the user device 102. For example, the user device 102 can be used to input a QR code, which has been displayed using the third-party system 104 after the transmission of communication 310, or to capture a QR image, which has been displayed using the third-party system 104 after the transmission of communication 310. If the QR image is captured, the QR image can be decoded into the QR code. The inputted or decoded QR code can be provided to a client application executed on the user device 102. The client application can generate the communication 402 having the QR code and the digital identifier. In some aspects, the communication 402 can also include signature data for the user device 102, such as data indicating a geographic location of the user device 102.

In some aspects, the user device 102 transmits the communication 402 via a secure, out-of-band communication channel to the telecommunications network server 108. The secure, out-of-band communication channel used to communicate with the telecommunications network server 108 is different from a communication channel with which the user device 102 communicates with the third-party system 104.

Providing the digital identifier in the communication 402 can allow implicit identification of a user of the user device 102 by the telecommunications network server 108. In some aspects, providing the digital identifier in the communication 402 can allow non-repudiation, by the user, of a transaction that involves the user and the third party and that is facilitated using the data flow depicted in FIG. 4.

The telecommunications network server 108 can respond to receiving the communication 402 by performing various operations that involve confirming the user's identity or being unable to adequately confirm the user's identity. For example, in operation 404, the telecommunications network server 108 can validate the QR code received in the communication 402 by matching the received QR code to a stored QR code (i.e., one of the electronic transaction codes 116 stored in the network-attached storage 112).

In operation 404, the telecommunications network server 108 can also associate the QR code with the received digital identifier. For example, the telecommunications network server 108 can retrieve, based on the received QR code, information about a particular third-party system 104 that is associated with a session key or other transaction identifier that is received in the data flow depicted in FIG. 3. The retrieved data allows the telecommunications network server 108 to identify a particular user, who is involved in a transaction with the third-party system 104, based on an interaction with the user device 102 by the telecommunications network server 108 (e.g., the communication 402).

The telecommunications network server 108 can generate or update a record involving the communication 402, where the record identifies the confirmation request included in the communication 402, the QR code included with the confirmation request, and the digital identifier received with the confirmation request. In some aspects, the record can also identify signature data (e.g. data indicating a geographic location of the user device 102) that is received in the communication 402.

In some aspects, the telecommunications network server 108 can also perform an operation 406, which involves determining whether the received QR code has expired. For instance, the authentication engine 110 can track the amount of time between providing the QR code to a third-party electronic device (e.g., via communication 310 depicted in FIG. 3) and receiving the QR code and the digital identifier from a user device 102 (e.g., via the communication 402 depicted in FIG. 4). At operation 406, the authentication engine 110 can compare the tracked amount of time to a threshold amount of time. The operation 406 can prevent fraud by increasing the likelihood that a user who provides the QR code to the telecommunications network server 108 is actually the intended recipient of the QR code in the data flow of FIG. 3.

If the tracked amount of time exceeds the threshold amount of time, the authentication engine 110 can configure the telecommunications network server 108 to transmit a communication 408 to the third-party system 104. The communication 408 includes a message indicating that the telecommunications network server 108 has denied the request to confirm the authenticity of the user of the user device 102. This refusal to confirm authenticity of the user can include a "QR timeout message" or other suitable message indicating that too much time has passed since the QR code (or another suitable electronic transaction code) has been provided to the third-party system 104.

If the tracked amount of time does not exceed the threshold amount of time, the authentication engine 110 can configure the telecommunications network server 108 to perform one or more additional operations for confirming the authenticity of the user. For example, the authentication engine 110 can perform operations 410, 412, 414.

In operation 410, the authentication engine 110 can perform one or more authentication operations with respect to the user. Examples of these authentication operations include (but are not limited to) requesting and confirming a personal identification number from the user via the user device 102, requesting and confirming certain biometric data from the user via the user device 102, etc. For instance, the user of the user device 102 is authenticated in accordance with one or more policies used by the authentication engine 110, the third party associated with the third-party system 104, or both. The authentication can be performed in an out-of-band manner, such that the telecommunications network server 108 communicates with the user device 102 via a different communication channel than the communication channel used by the user device 102 and the third-party system 104. The authentication operation allows the authentication engine 110 to verify that the user device 102 is in the possession of a user associated with the digital identity.

In operation 412, the authentication engine 110 can configure the telecommunications network server 108 to persist a status for the digital identifier (e.g., by storing the status in the network-attached storage 112 or another suitable non-transitory computer-readable medium).

In operation 414, the authentication engine 110 can perform a risk assessment for the user. The risk assessment operation can output a risk score for the user. The risk assessment operation can include one or more inputs regarding the user, the transaction (e.g., the channel signature), or some combination thereof.

Any suitable operation or set of operations can be used for the risk assessment. In one example, the telecommunications network server 108 can determine a PII velocity associated with the digital identifier and output a risk score based on the PII velocity. PII velocity can include a number of times, within a certain period, that identification information or parts of the identification information (e.g., a name, a social security number, the last four digits of a social security number, etc.) have been provided to or otherwise used by the telecommunications network server 108 or an analytical system in communication with the telecommunications network server 108. For instance, the PII velocity for a particular identity may increase if a large number of credit checks have been performed for that identity. In another example, the telecommunications network server 108 can determine a transactional velocity associated with the digital identifier and output a risk score based on the transactional velocity. Transactional velocity can include the number of transactions, within a certain period, that transactions involving an identity have been provided to or otherwise used by the telecommunications network server 108 or an analytical system in communication with the telecommunications network server 108. For instance, the transaction velocity for a particular identity may increase if a large number of accounts have been opened for that identity within a certain time period. In another example, the telecommunications network server 108 can determine if any known fraud indicators are associated with the digital identifier.

In operation 416, the authentication engine 110 can determine whether the risk score for the user exceeds a threshold risk score. If the risk score for the user exceeds a threshold risk score, the authentication engine 110 can configure the telecommunications network server 108 to transmit a communication 418 to the third-party system 104.

The communication 418 includes a message indicating that the telecommunications network server 108 has denied the request to confirm the authenticity of the user of the user device 102. This refusal to confirm authenticity of the user can include a transaction identifier and the risk score. The transaction identifier and the risk score allow the third-party system 104 to determine that an unacceptable level of risk is involved with continuing a transaction, which is identified by the transaction identifier, with a particular user who is associated with the identified transaction.

In some aspects, the telecommunications network server 108 can identify a status of the user device 102. In one example, the telecommunications network server 108 can communicate with user device 102 to verify that the user device 102 complies with certain security baseline standards (e.g. device is not jail-broken or otherwise compromised). In another example, the telecommunications network server 108 can communicate with one or more other computing devices (e.g., devices associated another online service accessed by the user device 102) to request a status of the user device 102. The telecommunications network server 108 can identify the status of the user device 102 based on a response received from the other computing device. If the user device does not comply with the security standards, the telecommunications network server 108 can transmit the denial of confirmation in communication 418.

If the risk score for the user does not exceeds a threshold risk score, the authentication engine 110 can configure the telecommunications network server 108 to perform operations 420 and 422 and to transmit a communication 424. In operation 420, the telecommunications network server 108 can retrieve PII or other data involving the user that is usable for completing a transaction between the user and the third party. The telecommunications network server 108 can retrieve the PII or other data using the digital identifier received in communication 402, e.g., by matching the digital identifier to a particular name, social security number, or other identification information that may be stored in the network-attached storage 112 or another non-transitory computer-readable medium. For instance, if the third-party system 104 provides an online form to the user device 102 (e.g., via a web browser) soliciting entry of PII, the solicited PII can be retrieved by the telecommunications network server 108.

In operation 422, the telecommunications network server 108 can generate or otherwise obtain a third-party identifier for a third party associated with the third-party system 104 (e.g., an identifier for a commercial entity). An example of a third-party identifier is an obfuscated digital identifier 118 that is generated specifically for a given third party. For instance, the telecommunications network server 108 can generate the obfuscated digital identifier 118 or other third-party identifier and associate it with both the third party the user of the user device 102. In this manner, the third-party identifier can be used by one or more third-party systems 104 associated with a given third party to authenticate the user for subsequent transactions between the user and the third party.

The communication 424 can include a confirmation of authentication for a user of the user device 102. The communication 424 can also include additional data. One example of the additional data is PII or other data involving the user that is usable for completing a transaction between the user and the third party, which was retrieved in operation 420. Another example of the additional data is the third-party identifier that is generated or otherwise obtained in operation 422. Another example of the additional data is the score generated by the risk assessment performed in operation 414.

In the example depicted in FIG. 4, an increased risk score indicates an increased risk of entering into a transaction with an entity purporting to be the user associated with the digital identifier. But other implementations are possible. For example, a higher score generated by a risk assessment can indicate a lower risk. In such an example, the authentication engine 110 can deny confirmation of authenticity (e.g., via communication 418) if a score generated by a risk assessment is below a threshold score, and can provide confirmation of authenticity (e.g., via communication 424) if a score generated by a risk assessment is above a threshold score.

In some aspects, the third-party system 104 can request, via a communication 426, that the user of the user device 102 enter limited confirmatory inputs as a risk-reduction measure (e.g., last four digits of the social security number, name, street number, etc.). The third-party system 104 can receive, via a communication 428, the limited confirmatory inputs from the user device 102. The third-party system 104 can match the limited confirmatory inputs to, for example, portions of the PII (or other data) that was provided to the third-party system 104 via the communication 424. The third-party system 104 can associate the third-party identifier received from the telecommunications network server 108 with a digital profile of the user maintained by the third party (e.g., a user account of an online service accessible via a third-party system 104).

The third-party system 104 can transmit a communication 430 to the telecommunications network server 108 indicating that the third-party identifier has been accepted by the third party and will be used for subsequent authentication of the user. The telecommunications network server 108 can respond to this notification by activating the third-party identifier in operation 432. Operation 432 can include setting a status of the third-party identifier to "active."

The activated third-party identifier can be used for subsequent authentications. For example, if the user subsequently requests to be authenticated using a "digital identifier" option involving communication with the authentication engine 110, a third-party system 104 can send a request to the telecommunications network server 108 asking that the user associated with the third-party identifier be authenticated. The authentication engine 110 can perform one or more operations (e.g., geolocation of the user device 102, biometrics, etc.) to authenticate the user associated with the third-party identifier.

Example Computing Environment for Authentication Operations

Figure 5:
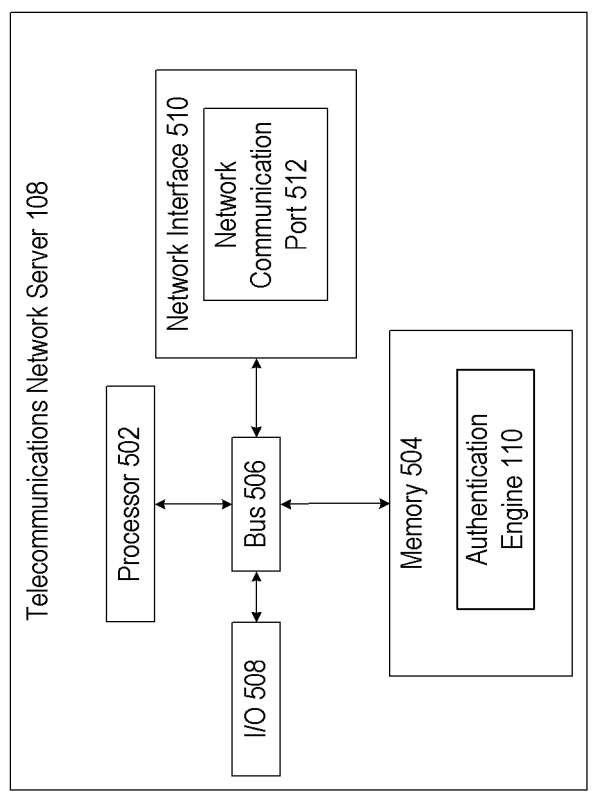
FIG. 5 is a block diagram depicting an example of a telecommunications network server to perform authentication operations, according to certain aspects.

Any suitable computing system or group of computing systems can be used to perform the authentication operations described herein. For example, FIG. 5 is a block diagram depicting an example of a telecommunications network server 108. The example of the telecommunications network server 108 can include various devices for communicating with other devices in the computing system 100, as described with respect to FIG. 1. The telecommunications network server 108 can include various devices for performing one or more authentication operations described above with respect to FIGS. 1-4.

The telecommunications network server 108 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The telecommunications network server 108 may also include a number of external or internal devices such as input or output devices. For example, the telecommunications network server 108 is shown with an input/output interface 508 that can receive input from input devices or provide output to output devices. A bus 506 can also be included in the telecommunications network server 108. The bus 506 can communicatively couple one or more components of the telecommunications network server 108.

The telecommunications network server 108 can execute program code that includes the authentication engine 110. The program code for the authentication engine 110 may be resident in any suitable computer-readable medium and may be executed on any suitable processing device. For example, as depicted in FIG. 5, the program code for the authentication engine 110 can reside in the memory 504 at the telecommunications network server 108. Executing the authentication engine 110 can configure the processor 502 to perform the operations described herein with respect to FIGS. 2-4. In some aspects, one or more of the electronic transaction codes 116, the digital identifiers 114, and the digital identifiers 118 can also be stored in the memory 504.

In some aspects, the telecommunications network server 108 can include a network interface device 510. A network interface device 510 can include any device or group of devices suitable for establishing a wired or wireless data connection to one or more data networks 106. Non-limiting examples of the network interface device 510 include an Ethernet network adapter, a modem, etc. A network interface device 510 can include one or more network communications ports 512, where an address or other identifier of the communication port is used for communications with various client devices (e.g., a user device 102, a third-party system 104, etc.).

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A server device comprising:
   at least one processor; and
   a non-transitory computer-readable storage device comprising instructions that are executable by the at least one processor to:
      receive an electronic transaction code and a digital identifier of a user device associated with a user to authenticate the user to perform transactions through the user device at a third-party electronic device;
      confirm the electronic transaction code and the digital identifier, wherein confirming comprises:
         validating the electronic transaction code by matching the electronic transaction code with a stored electronic transaction code from a plurality of electronic transaction codes stored in a network storage; and
         verifying authenticity of the user associated with the digital identifier as involved in a transaction with the third-party electronic device; and
      in response to confirming the electronic transaction code and the digital identifier, provide a confirmation of the authenticity of the user to the third-party electronic device for use in authenticating a requested transaction by the user device at the third-party electronic device.

2. The server device of claim 1, wherein the non-transitory computer-readable storage device includes instructions that are executable by the processor to:
   transmit via a network communications port the digital identifier to the user device associated with the user authenticated by the server device, the digital identifier being electronically tethered or bound to the user device.

3. The server device of claim 1, wherein confirming the electronic transaction code and the digital identifier comprises:
   in response to receiving the electronic transaction code and the digital identifier, transmit a demand to the user device for the user to provide confirmatory input to the user device for receipt by the server device; and
   receive the confirmatory input from the user device,
   wherein the confirmation of authenticity of the user is provided to the third-party electronic device only subsequent to receiving the confirmatory input from the user device.

4. The server device of claim 1, wherein the electronic transaction code is a Quick Response (QR) code that is scanable by the user device.

5. The server device of claim 1, wherein the non-transitory computer-readable storage device includes instructions that are executable by the processor to:
   monitor an amount of time between transmitting the electronic transaction code to the third-party electronic device and receiving the electronic transaction code and the digital identifier from the user device; and
   in response to determining the amount of time is greater than a pre-selected threshold amount of time, transmit via a network communications port an indication of unsuccessful confirmation of authenticity of the user to the third-party electronic device.

6. The server device of claim 1, wherein the non-transitory computer-readable storage device includes instructions that are executable by the processor to:
   transmit via a network communications port an obfuscated version of the digital identifier to the third-party electronic device, the obfuscated version of the digital identifier being usable by the third-party electronic device to authenticate the user based on the digital identifier stored in the user device and being not usable to confirm authenticity of the user with the electronic transaction code.

7. The server device of claim 1, wherein the non-transitory computer-readable storage device includes instructions that are executable by the processor to:
   receive from the user device a command to share personal identification information about the user to the third-party electronic device and one or more types of personal identification information to share to the third-party electronic device; and
   transmit via a network communications port the personal identification information about the user as selected from the user device to the third-party electronic device.

8. The server device of claim 1, wherein the non-transitory computer-readable storage device includes instructions that are executable by the processor to:
   receive requests from the third-party electronic devices that are separate from each other, the requests indicating that the user is requesting to be authenticated for transactions with the third-party electronic devices;
   transmit a plurality of electronic transaction codes to the third-party electronic devices, the plurality of electronic transaction codes including unique codes such that each unique code corresponds to one transaction;
receive the plurality of electronic transaction codes and the digital identifier from the user device; and
in response to confirming the plurality of electronic transaction codes and the digital identifier, transmit confirmations of authenticity of the user to the third-party electronic devices.

9. A method comprising:
receiving an electronic transaction code and a digital identifier of a user device associated with a user to authenticate the user to perform transactions through the user device at a third-party electronic device;
confirming the electronic transaction code and the digital identifier, wherein confirming comprises:
validating the electronic transaction code by matching the electronic transaction code with a stored electronic transaction code from a plurality of electronic transaction codes stored in a network storage; and
verifying authenticity of the user associated with the digital identifier as involved in a transaction with the third-party electronic device; and
in response to confirming the electronic transaction code and the digital identifier, providing a confirmation of the authenticity of the user to the third-party electronic device for use in authenticating a requested transaction by the user device at the third-party electronic device.

10. The method of claim 9, comprising:
transmitting via a network communications port the digital identifier to the user device associated with the user, the digital identifier being electronically tethered or bound to the user device.

11. The method of claim 9, wherein confirming the electronic transaction code and the digital identifier comprises:
in response to receiving the electronic transaction code and the digital identifier, transmitting a demand to the user device for the user to provide confirmatory input to the user device; and
receiving the confirmatory input from the user device, wherein the confirmation of authenticity of the user is provided to the third-party electronic device only subsequent to receiving the confirmatory input from the user device.

12. The method of claim 9, wherein the electronic transaction code is a Quick Response (QR) code that is scanable by the user device.

13. The method of claim 9, comprising:
monitoring an amount of time between transmitting the electronic transaction code to the third-party electronic device and receiving the electronic transaction code and the digital identifier from the user device; and
in response to determining the amount of time is greater than a pre-selected threshold amount of time, transmitting via a network communications port an indication of unsuccessful confirmation of authenticity of the user to the third-party electronic device.

14. A non-transitory computer-readable medium embodying program code for authenticating a user to a third-party electronic device, the program code comprising instructions which, when executed by a processor, cause the processor to perform operations including:
receiving an electronic transaction code and a digital identifier of a user device associated with a user to authenticate the user to perform transactions through the user device at a third-party electronic device;
confirming the electronic transaction code and the digital identifier, wherein confirming comprises:
validating the electronic transaction code by matching the electronic transaction code with a stored electronic transaction code from a plurality of electronic transaction codes stored in a network storage; and
verifying authenticity of the user associated with the digital identifier as involved in a transaction with the third-party electronic device; and
in response to confirming the electronic transaction code and the digital identifier, providing a confirmation of the authenticity of the user to the third-party electronic device for use in authenticating a requested transaction by the user device at the third-party electronic device.

15. The non-transitory computer-readable medium of claim 14, comprising instructions that are executable by the processor to perform operations comprising:
transmitting via a network communications port the digital identifier to the user device associated with the user, the digital identifier being electronically tethered or bound to the user device.

16. The non-transitory computer-readable medium of claim 14, wherein confirming the electronic transaction code and the digital identifier comprises:
in response to receiving the electronic transaction code and the digital identifier, transmitting a demand to the user device for the user to provide confirmatory input to the user device; and
receiving the confirmatory input from the user device, wherein the confirmation of authenticity of the user is provided to the third-party electronic device only subsequent to receiving the confirmatory input from the user device.

17. The non-transitory computer-readable medium of claim 14, wherein the electronic transaction code is a Quick Response (QR) code that is scanable by the user device.

18. The non-transitory computer-readable medium of claim 14, comprising instructions that are executable by the processor to perform operations comprising:
monitoring an amount of time between transmitting the electronic transaction code to the third-party electronic device and receiving the electronic transaction code and the digital identifier from the user device; and
in response to determining the amount of time is greater than a pre-selected threshold amount of time, transmitting via a network communications port an indication of unsuccessful confirmation of authenticity of the user to the third-party electronic device.

19. The non-transitory computer-readable medium of claim 14, comprising instructions that are executable by the processor to perform operations comprising:
transmitting via a network communications port an obfuscated version of the digital identifier to the third-party electronic device, the obfuscated version of the digital identifier being usable by the third-party electronic device to authenticate the user based on the digital identifier stored in the user device and being not usable to confirm authenticity of the user with the electronic transaction code.

* * * * *

UNITED STATES PATENT AND TRADEMARK OFFICE
CERTIFICATE OF CORRECTION

PATENT NO. : 12,261,846 B2  
APPLICATION NO. : 18/631333  
DATED : March 25, 2025  
INVENTOR(S) : Helcio Cano et al.

Page 1 of 1

It is certified that error appears in the above-identified patent and that said Letters Patent is hereby corrected as shown below:

In the Claims

Column 18, Line 23, Claim 4, delete "scanable" and replace with -- scannable --.

Column 19, Line 46, Claim 12, delete "scanable" and replace with -- scannable --.

Column 20, Line 40, Claim 17, delete "scanable" and replace with -- scannable --.

Signed and Sealed this  
Thirteenth Day of May, 2025

Coke Morgan Stewart  
*Acting Director of the United States Patent and Trademark Office*